United States Patent Office 3,481,890
Patented Dec. 2, 1969

3,481,890
WATER-DILUTABLE HEAT-CURABLE LACQUER COMPOSITIONS
Rolf Güldenpfennig, Hamburg, Germany, assignor to Reichhold Chemie Aktiengesellschaft, Hamburg-Wandsbek, Germany
No Drawing. Filed May 27, 1965, Ser. No. 459,433
Claims priority, application Germany, May 29, 1964, R 38,003
Int. Cl. C08g 39/10, 37/34
U.S. Cl. 260—20                                    12 Claims

ABSTRACT OF THE DISCLOSURE

A water-dilutable and heat-curable composition and method of electrophoretic coating by the application of such a composition, the latter comprising: (a) a plasticizing synthetic resin composed of polymers of polymerizable vinyl compounds and alpha-beta unsaturated carboxylic acids having in 1800 grams of these components at least one acid equivalent of copolymerizable alpha-beta ethylenically unsaturated carboxylic acid, the polymerization having been performed in the presence of alkyd resins which contain ethylenic double bonds, free carboxyl groups with an acid number of at least 35 and hydrophylic groups; and (b) a strong nitrogenous base to form soaps with the plasticizing synthetic resins.

---

The present invention relates to water-dilutable heat-curable lacquer compositions.

It is an object of the present invention to improve the properties of prior art films produced from water-dilutable heat-curable lacquers in relation to corrosion resistance, gloss, hardness, pigment retention and resistance to yellowing.

It is old to produce water-soluble heat-curable lacquers by the combination of:

(a) Water-soluble or at least hydrophilic, low molecular weight hardenable condensation products such as aminoplasts or phenolic resins, with (b) Plasticizing synthetic resins generally alkyd resins, and (c) Strong nitrogenous bases.

Reference is made to prior art German Patent 943,715 and Austrian Patent 180,407 which are incorporated herein.

The heat-curable lacquers of this invention which are formed of hydrophilic low-molecular weight hardenable condensation products, plasticizing synthetic resins and ammonia or strong organic nitrogenous bases are characterized by having their plasticizing synthetic resin composed of polymers of polymerizable vinyl compounds and alpha-beta unsaturated carboxylic acids, where in 1800 g. of these components there must be at least one carboxyl group, and where the polymerization is performed in the presence of alkyd resins which contain ethylenic double bonds, free carboxyl groups (acid numbers of at least 35) and hydrophylic groups. The acid numbers of the added alkyd resins have a contemplated upper limit of 300. Preferred acid number ranges are 40 to 50 and 70 to 120.

By water-dilutable heat-curable lacquers are to be understood those lacquers which are dilutable with water, either by themselves or at least after adding a minor amount of an organic solvent which is miscible with water either in unlimited proportions or over a wide range of proportions. Organic solvents which can be used for this purpose include, for example: monoethers of ethylene glycol and diethylene glycol with lower monovalent alcohols such as methanol, ethanol, propanol, isopropanol and butanol and diethers of ethylene glycol and diethylene glycol with lower aliphatic monovalent alcohols such as methanol and ethanol, preferably the diethyl ether of ethylene glycol. Diacetone alcohols of lower ketones such as acetone, methyl-ethyl ketone and methyl-isobutyl ketone can also be used, as well as monoethers of ethylene glycol or diethylene glycol with lower monovalent alcohols such as methanol, ethanol, propanol, isopropanol or butanol. The water-dilutable heat-curable lacquers containing the last-named solvent should soon be ready for marketing.

It is advantageous during the use of these water-dilutable heat-curable lacquers to add a wetting agent or an emulsifier.

The hydrophilic hardenable low-molecular condensation products (a) such as aminoplasts and/or phenolic resins impart to the heat-curable resins the property of being converted during heating into the insoluble and infusible condition. By "hardenable" condensation products are meant also those which when heated by themselves pass into a high molecular weight but fusible condition.

As hardenable low molecular hydrophilic condensation products can be mentioned, e.g., phenol-alcohols and phenol-polyalcohols, namely low molecular compounds formed by condensation mono- or polynuclear phenols with aldehydes, preferably formaldehyde, in an alkaline medium. Of special significance are the methylol compounds of phenol-carboxylic acids. A phenol-carboxylic acid of that kind is e.g. the partial ester of a polyvalent polynuclear phenol with glycolic acid which is described in the German printed specification 1,113,775.

As hardenable hydrophylic low molecular condensation proucts it is also possible to make use of aminoplasts, namely aldehyde reaction products of convertible compounds, such as urea, ethylene-urea, dicyan-diamide and amino-triazinenes such as melamine, benzguanamine, acet- guanamine and form-guanamine with aldehydes. The above mentioned compounds can be reacted with aldehydes such as formaldehyde, acetaldehyde, crotonaldehyde, acrolein, benzaldehyde, furfural, etc. By "aldehydes" are also meant aldehyde-producing compounds such as paraformaldehyde, paraldehyde and trioxymethyl-methylene. The preferred aldehyde is formaldehyde while the preferred aldehyde-binding compounds are melamine and urea.

The reaction with aldehydes is performed in the usual molar ratios, e.g. with urea resins in the usual urea-formaldehyde-molar ratio of 1:1.5 to 1:4 and with melamine resins in a melamine-formaldehyde-molar ratio of 1:1.5 to 1:6. The nitrogenous polyalcohols are preferably used in partially or completely alkylated or alcohol-modified form. Suitable for use are with dicarboxylic acids partially esterified ethers of nitrogenous polymethylol compounds of the kind obtained, e.g. by reesterification of hexamethoxy-methyl-melamine with adipic acid. In the heat-curable resins of this invention, 7 to 50% of these condensation products are present, based on the weight of the solid resin present.

To accelerate their hardening the heat-curable resins of this invention can have catalysts added to them. Such catalysts must be water-soluble or at least dispersible in water, or must become so during their introduction. The use of such catalysts is, however, not imperative, Acid substances or their saltlike compounds are suitable for use as catalysts.

Suitable alkyd resins of component (b) are the relatively high molecular ethylenic double bond containing mixed esters of polyvalent alcohols and polycarboxylic acids, in which higher and preferably unbranched aliphatic groups are built in, at least in part. Such groups can be added to the resin in the form of fatty acids, resin acids, higher polycarboxylic acids or higher alcohols.

The polycarboxylic acids which are used for building up the alklyd resins can be aliphatic, hydroaromatic or aromatic saturated or unsaturated, e.g. such as succinic, adipic, sebacic, cirtic, maleic, fumaric, hexahydrophthalic, phthalic, isophthalic or terephthalic acid, or the anhydrides of those which form anhydrides. Of importance are also the partial esters of undefined polycarboxylic acids or their anhydrides which are produced in a known manner by adduct-formation of alpha-beta unsaturated dicarboxylic acids or their anhydrides such as maleic, fumaric, itaconic, citraconic, mesaconic or aconitic acid on high molecular unsaturated compounds, especially fatty oils such as dehydrated castor oil, safflower oil, wood oil, linseed oil, soya bean oil, etc., their fatty acids and abeitic acid (colophony). Preferred adducts are those in which the molecular ratio, relative to the unsaturated fatty acids and alpha-beta unsaturated dicarboxylic acids amounts to .5:1 to 1:1. The ester resins are further characterized by the presence of acid groups, preferably carboxylic groups, and numerous hydrophylic groups, preferably hydroxyl groups, where the ratio of carboxyl groups to hydroxyl groups is at least 1:1. The acid number should be at least 35.

By "relatively high molecular" is meant those resins which have molecular weights of at least a few hundred, but whose molecular dimensions have not exceeded the solubility limit, which means that the resins are e.g. still soluble in butyl glycol.

It has been found to be advantageous, although not necessary, to perform the reaction of the ester resins with the vinyl monomers in the presence of a solvent. Suitable solvents are those which are miscible with water, or at least are compatible with water in the presence of the resin as a solvent adjuvant. If other solvents are used, then the latter must be removed at the end of the reaction before the remaining ingredients are added.

By the selection of vinyl monomers, the properties of the film can be influenced. Suitable vinyl monomers are especially the alkyl esters of alpha-beta unsaturated monocarboxylic acids having 4 to 15 carbon atoms as methyl acrylate, ethyl acrylate, propyl acrylate, butyl acrylate, octyl acrylate, decyl acrylate and lauryl acrylate, as well as the corresponding meth-, eth- and phenylacrylate, propylcrotonate, butylcrotonate etc., also hydroxyl-alkyl-esters of alpha-beta unsaturated carboxylic acids having 4 to 15 carbon atoms such as 2-hydroxy-ethyl-acrylate, 2-hydroxy-propyl-acrylate, 2-hydroxy-butyl-acrylate, 3-hydroxy-butyl-acrylate, 6-hydroxy-hexyl-acrylate and the corresponding methacrylates, ethacrylates, phenylacrylates, 2-hydroxylethyl-maleinate, 2-hydroxybutyl-maleinate, di-(2-hydroxy-propyl)-maleinate and the corresponding fumarates, 2-hydroxy-3-chloropropyl-acrylate, 2-hydroxy-1-phenyl-ethyl-acrylate, 2-hydroxy-3-butoxypropyl-acrylate and the corresponding ethacrylates and phenylacrylates, but also other polymerizable vinyl compounds such as styrene, nuclear-substituted styrenes (o-, m-, p-methyl, ethyl-, propyl-, butyl-styrene, 2,4-; 2,3-; 2,5-dimethyl-styrene, 2,4-; 2,3-; 2,5-dichlorstyrene) and styrenes substituted in the side chain such as α-methyl-styrene, α-ethyl-styrene, α-chlor-styrene, etc. Off these vinyl monomers the preferred ones are:

Methyl acrylate, methyl methacrylate, ethyl acrylate, ethyl ethacrylate, as well as 2-hydroxyethyl acrylate and 2-hydroxypropyl acrylate. Among the preferred vinyl monomers are also styrene, α-methyl styrene and vinyltoluene. For the water-dilutability of the reaction products of ester-resin and the monomers mentioned here, it is necessary for the vinyl monomers mentioned here, regardless of whether they are used alone or as components of mixtures, to be mixed with a compound which can copolymerize with the monomers and which carries acid groups, preferably carboxyl groups. Suitable for this purpose are alpha-beta unsaturated monocarboxylic acids, having 3 to 6 carbon atoms preferably acrylic acid or methacrylate acid, also cinnamic acid, β-benzoyl-acrylic acid, crotonic acid, etc., and alpha-beta unsaturated polycarboxylic acids or their anhydrides such as maleic acid, fumaric acid, itaconic acid, citraconic acid, mesaconic acid, aconitic acid and the corresponding halogen-substituted acids such as chlormaleic acid.

The monomers that carry carboxyl groups can be brought into reaction alone, in mixtures with one another, alone in mixtures with the first-named monomers that do not carry free carboxyl groups, or in mixtures with these. It is necessary, however, that in 1800 g. of the entire monomer mixture there is at least one acid equivalent of carboxyl groups. This means that in 1800 g. of the total monomer mixture, there must be one acid equivalent of the above mentioned vinyl monomers which carry free carboxyl groups. The preferred number of such acid equivalents is between 3 and 6.

Other polymerizable vinyl compounds such as acryl- or methacryl-amide, acryl- or methacryl-nitrile etc., can be added singly or in mixtures to the monomer mixture.

The ratio of the vinyl monomers to the alkyd resin can vary from 1:9 to 9:1, preferably from 2:8 to 4:6.

The reaction products are rendered water-soluble by neutralization with ammonia or the strong organic nitrogenous bases of component (c) which can be tertiary, secondary or primary, as e.g. triethylamine, trimethylamine, diethylamine, monoethylamine, piperidine or morpholine. Tertiary, secondary or primary amines carrying hydroxyl groups are also very suitble, as e.g. triethanolamine, diethanolamine, monoethanolamine, N-dimethyl-ethanolamine, N-methyl-ethanolamine, N-diethanolamine, mono-isopropanolamine, diisopropanolamine, triisopropanolamine and polyglycolamines, preferably diaglycolamine. Use can also be made of butanolamine, hexanolamine, methyl-diethanolamine, octanolamine and polyamines such as ethylene-diamine, diethylene-triamine and triethylene tetramine, the latter generally occurring only in mixtures with monoamines. As preferred strong organic nitrogenous bases, volatile tertiary amines such as triethyl amine and/or tertiary amines carrying hydroxyl groups are used, e.g. N-dimethyl-ethanolamine. It is not always necessary to use the nitrogenous bases in amounts that would be theoretically necessary for neutralization, sufficient water-solubility being often obtained with lesser amounts of the base.

In the mixed polymerization of the components (b) the temperature must be controlled in such a manner that further esterification of the alkyd resins will be largely avoided. This means that the upper temperature limit should be kept at about 160° C., the lower temperature limit being about 70° C. The work is preferably done between about 120 and 140° C. The polymerziation is performed by warming to the specified temperature in the presence of catalysts. These usually consist of peroxides, e.g. ditert.-butyl peroxide, cumol-hydro-peroxide, benzoyl peroxide or also redox systems.

In the specific examples which follow, the composition is prepared by combination of the three components: (A) the preliminary product; (B) the plasticizing synthetic resin; and (C) the ammonia or nitrogenous bases instead of the components (a), (b) and (c) of the prior art.

The components (A), (B) and (C) can be added in any desired order. It is preferable to combine components (A) and/or (B) with (C) in the presence of water. The temperature during the mixing should be such that the desired water solubility is obtained, but without much saponification of the ester resins, the temperature being preferably kept between 20 and 50° C., although other ranges are not excluded. The additional organic solvents must be selected in such a manner that they will be compatible with the other components of the mixture. The total amount of solvent used should be as small as possible, preferably not over 35% by weight of the solid resin.

The aqueous solutions of the synthetic resins of this invention, which may be pigmented and/or mixed with fillers, can serve as heat-curable lacquers for successive applications to metallic or metallized objects by spraying, immersion, roller-coating or electrophoresis.

In the examples, "parts" means parts by weight.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

(A) Production of the preliminary product I 60 parts dehydrated castor oil and 20 parts castor oil are boiled with 26 parts pentaerythrite and 26 parts trimethylolpropane, 50 parts phthalic anhydride and 18 parts adipic acid to produce an alkyd resin with an acid number of 40–50, the oil having been previously re-esterified with one part of the re-esterifying agent.

(B) Production of the plasticizing synthetic resin 110 parts preliminary product I are dissolved in 33 parts glycol-monoisopropyl-ether and in the course of 5 hours a mixture of 4 parts methacrylic-acid-butyl-ester, 20 parts methacrylic-acid-methyl-ester, 5 parts acrylic acid and 1 part di-tert.-butylperoxide is added at 130° C. and the mixture being stirred until the solids amount to 80% (1 g. of the reaction solution being kept 1 hour at 110° C. in an 8.5 cm. watchglass and then weighed). The reaction product is a light-colored very viscous resin. The synthetic resin thus obtained must after neutralization with ammonia be completely soluble in water.

(C) Production of the heat-curable lacquer by addition of the nitrogenous base 100 parts of the resin of (B) are neutralized with triethylamine in such a manner that a 20% aqueous solution of the resin has a pH of 7–9. This soap solution is reacted with 20 parts (relative to the solid resin) of a melamine resin or a solution thereof and consisting essentially of the dimethylether of the tetramethylol-melamine. With a pigment such as titanium dioxide that has been triturated with a binder in a binder-pigment ratio of 1:0.8, the lacquer can be diluted with water to the required concentration for the contemplated method of application and with the addition eventually of an organic solvent such as butanol to regulate the viscosity. After being coated upon sheet metal and heated 30 minutes to 150° C., a hard and durable glossy film is obtained which adheres firmly.

To prove that a technical advance has been made over the prior art as evidenced by the German and Austrian patents cited above, the following table gives the results obtained with the heat-cured lacquer of Example 1 in comparison with the results obtained with the preliminary product of the Austrian patent:

tioned as the anode. After the application of a D.C. voltage of about 100 volts (higher as well as lower voltages can be used), the lacquer is deposited as a uniform dense film which after being heat-cured at 150–180° C. is very hard and durable.

EXAMPLE 2

(B) Production of the plasticizing synthetic resin 80 parts of the preliminary product I are diluted with 24 parts butyl glycol and in the course of 3 hours a mixture of 8 parts styrene, 8 parts alpha-methylstyrene, 5 parts acrylic acid, 0.5 part di-tert.-butyl-peroxide and 1 part lauryl mercaptain is added at 130° C. After all the ingredients are added the temperature is maintained until a solids content of 79.5% is reached (1 g. of the reaction solution being kept on an 85 mm. watch-glass ½ hour at 130° C. in a drying oven). After neutralization with ammonia the resin has unlimited dilutability with water.

(C) Production of the heat-curable lacquer by addition of a nitrogenous base 100 parts of the plasticizing synthetic resins of Example 2(B) are neutralized with triethylamine or N-dimethylethanolamine as in Example 1(C), and as there described, are converted into a water-dilutable heat-hardenable lacquer.

Additions of 1 to 3% by weight of suitable wetting agents or a mixed polymer of acrylic esters with acrylic acid and neutralized with amines, can be added to diminish the sensitivity of the lacquer to fats. The same influence is also exerted by selected resins described in the German printed specification 1,053,696.

EXAMPLE 3

(A) Production of preliminary product II 27.5 parts dehydrated castor oil, 10 parts soya bean oil, 5 parts colophony and 0.7 part pentaerythrite are esterified under inert gas at 260° C. to an acid number of close to 0. To facilitate the esterification, use can be made of an azeotropic agent for removing the water that results from the reaction, e.g. xylene, or a vacuum. After esterification is completed and the dragging agent is removed, the adduct is formed at 180–220° C. in a known manner with 10 parts maleic anhydride. After completion of the adduct, the contents of the kettle are cooled to 100° C., 0.5 part water is added, and after closure of the kettle the contents are kept at that temperature 2 hours. 11.6 parts trimethylol-propane are then added and the mixture is kept at 90–120° C. another 1 to 2 hours. The acid number rises to about 110.

(B) Production of the plasticizing synthetic resin 100 parts preliminary product II are mixed with 11 parts butyl glycol and in the course of 3 to 5 hours a mixture of 4 parts methacrylic-acid-butyl-ester, 20 parts meth-

| | According to Example 1 | With only the preliminary product I of Austrian patent 180,407 |
|---|---|---|
| Hardness: | | |
| Pendulum hardness | 90″ | 60″. |
| Surface | Glossy | Dull. |
| Yellowing | None | Slight. |
| Water-resistance | Not attacked after 6 days | Definitely attacked after 3 days. |
| Elasticity | 6 | 7. |

It has also been found that the heat-curable lacquers of this invention can be applied by the electrophoretic method. Especially suitable are those lacquers in which the alkyd resin consists of a partially esterified adduct of an alpha-beta unsaturated dicarboxylic acid or its anhydride or fatty oils or their fatty acids or resin acids (colophony).

The electrophoretic deposition of the lacquer of this invention is performed by diluting the lacquer with pure water to a solids content of about 12% in the electrophoresis tank in which the body to be lacquered is posiacrylic-acid-methyl-ester, 0.75 part di-tert.-butyl-peroxide and 1.3 parts lauryl mercaptan is added at 115–130° C. After such addition, the mixture is allowed to react until a solids content of at least 91% is reached (see Example 2 for method of testing). While the mixture is kept standing, a limited amount of catalyst mixture of di-tert.-butylperoxide and lauryl mercaptan is added in the above-mentioned proportion (10–20% of the above-mentioned total amount). A lower viscosity of the end product will result with the same solids content. The resin is then diluted with 27 parts butyl glycol and 13.5 parts water and is neutralized with 16.7 parts triethylamine at a temperature below 40° C. until the pH of a 20% solution in water is 7.5–8.

Instead of triethylamine, a corresponding amount of N-dimethyl-ethanolamine can be used for neutralization.

(C) Production of the heat-curable lacquer 200 parts of the resin from (B) are mixed with 49 parts of a low molecular melamine resin produced in a known manner (see German printed specification 1,113,774, Example 3a), solids content 50%, and 6 parts of hexamethoxy-methyl-melamine. With a pigment, e.g. titanium dioxide triturated in pigment-binder ratio of 0.8:1, the lacquer, with a possible addition of an organic solvent such as butanol to regulate the viscosity in accordance with the intended method of application, can be diluted with water. Suitable wetting agents (see Example 2C) can be aded in amounts of 1–3% by weight to diminish the sensitivity of the lacquer to fat. The lacquer gives a glossy adherent and corrosion-resistant coating after being heat-cured 30 minutes at 150° C.

EXAMPLE 4

(B) Production of the plasticizing synthetic resin 110 parts preliminary product II are dissolved in 44 parts butyl glycol and to the solution is then added a mixture of 4 parts methacrylic-acid-butyl-ester, 20 parts methacrylic-acid-methyl-ester, 5 parts acrylic acid, 0.75 part di-tert.-butyl-peroxide and 1.3 parts lauryl mercaptan in the course of 3–5 hours at 115–130° C. After this mixture has been added the preparation is kept at the above temperature until the solids content amounts to about 75%. During this reaction a limited amount (10–20%) of the catalyst mixture of di-tert.-butyl-peroxide and lauryl mercaptan is added in the above proportion. The resin is then diluted with 13.5 parts water and is neutralized at below 40° C. with triethylamine until the pH of a 20% aqueous solution reaches 7.5–8.

(C) Production of the heat-curable lacquer

The plasticizing resin of Example 4(B) is converted into a heat-curable lacquer by the method of Example 2(C).

This heat-curable lacquer has the important advantage of permitting the heat-curing of relatively thick coatings.

EXAMPLE 5

(A) Production of preliminary product III 27.5 parts isomerized safflower oil, 10 parts soya bean oil, 5 parts colophony and 0.7 part pentaerythrite are esterified under inert gas at 260° C. to an acid number of close to 0. To facilitate the esterification, use can be made of an azeotropic agent (e.g. xylene) or a vacuum. After the esterification and removal of the dragging agent, the adduct is formed in a known manner with 10 parts maleic anhydride at 180–220° C. As soon as the adduct formation has been completed, the product is cooled to 100° C., 0.5 part water is added and the mixture is kept about 2 hours in a closed kettle at a temperature of 100–110° C. 9.7 parts trimethylol-propane are then added and the mixture is kept another 2 hours at 90–100° C.

(B) Production of the plasticizing synthetic resin 110 parts preliminary product III are mixed with 11 parts butyl-glycol and to that mixture is added a mixture of 4 parts methacrylic-acid-butyl-ester, 10 parts methacrylic-acid-methylester, 10 parts hydroxypropyl-methacrylate, 5 parts acrylic acid, 0.75 part di-tert.-butyl-peroxide and 1.3 parts lauryl mercaptan in the course of 3–5 hours at 115–125° C. After such addition the mixture is kept at the above temperature until a solids content of 90.5% is reached. During the reaction 0.07 part di-tert.-butyl-peroxide and 0.13 part lauryl mercaptan are added. After the final solids content has been reached, the resin is diluted with 27 parts butyl-glycol and 13.5 parts water and the mixture then neutralized with about 16.7 parts triethylamine until the pH value of a 20% aqueous solution is 7.4–7.8. Instead of triethylamine, an aqueous ammonia solution or N-dimethyl-ethanolamine can be used.

(C) Production of the heat-curable resin

The above-mentioned plasticizing resin of Example 5(B) is converted into a heat-curable lacquer according to Example 2(C).

EXAMPLE 6

(A) Production of preliminary product IV

The preparation of prelimenary product IV corresponds to the preparation of product III, except that safflower oil is used instead of castor oil.

(B) Production of palsticizing synthetic resin

The preparation corresponds to that of the plasticizing synthetic resin of Example 3(B), except that only the preliminary product IV is used instead of product II. The resulting resin has a lower viscosity.

(C) Production of the heat-curable lacquer 200 parts of the plasticizing synthetic resin of Example 6(B) are mixed with 6 parts hexamethoxy-methyl-melamine and 74 parts low molecular melamine resin (solids content 50%) (see Example 3). With pigments, e.g. titanium dioxide triturated with binder in the ratio 0.8:1 the lacquer can be mixed with a viscosity-regulating organic solvent, e.g. butanol, so that upon the addition of water it will have a viscosity that is suitable for the intended purpose.

After being heat-cured 30 minutes at 150° C., the lacquer forms a glossy non-yellowing coating.

EXAMPLE 7

(B) Production of plasticizing synthetic resin

The preparation corresponds to that of the plasticizing synthetic resin of Example 3(B) except that for neutralization concentrated aqueous ammonia solution instead of triethylamine is used.

(C) Production of the heat-curable lacquer 200 parts of the plasticizing synthetic resin of Example 6(B) are mixed with 19 parts low molecular hydrophile phenol resin which is produced as follows:

60 parts p.tert.butylphenol and 80 parts aqueous formaldehyde solution (30%) are reacted in a known manner at about 40° C. under influence of strong acids until the contents of free formaledhyde has decreased to about 0. With the help of strong acids the resol gets decomposed and is washed salt-free. The phenol resin has a solid content of 60%.

The baking lacquer so produced can be further diluted with water and results after baking at 150 to 180° C. (20 to 30 minutes) as a resistant coat.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A water-dilutable, heat curable lacquer composition consisting essentially of:
   (a) hydrophilic, water-soluble, low molecular weight hardenable condensation products of the group consisting of aminoplasts and phenolic resins which, when heated by themselves, pass into a high molecular weight but fusible condition;
   (b) a mixture of plasticizing synthetic resins; and
   (c) bases of the group consisting of ammonia, and strong nitrogenous bases which form soaps with said mixture of plasticizing synthetic resins; wherein said plasticizing synthetic resins (b) are polymers of:
  (1) vinyl monomers selected from the group consisting of alkyl esters of α,β-unsaturated monocarboxylic acids having 4 to 15 carbon atoms, hydroxy alkyl esters of unsaturated monocarboxylic acids having 4 to 15 carbon atoms, styrene, methyl styrene, ethyl styrene, propyl styrene, butyl styrene, dimethyl styrene, dichlorstyrene, α-chlor styrene, acryl-amide, methacryl-amide, acryl-nitrile, methacryl-nitrile and mixtures thereof;
  (2) α,β-unsaturated carboxylic acid monomers having 3 to 6 carbon atoms and at least one acid equivalent in 1800 grams of components (1) and (2); and
  (3) alkyd resins containing an ethylenic double bond, a free carboxyl group having an acid number of about 35–300 and a hydrophilic group; said component (a) being present in a quantity of about 7–50% of the total resin weight.

2. The composition of claim 1, wherein said organic nitrogenous bases of (c) are present in an amount less than enough to achieve complete neutralization, but sufficient to render the lacquer hydrophilic to water soluble.

3. The composition of claim 1, wherein said ammonia of (c) is present in an amount less than enough to achieve complete neutralization, but sufficient to render the lacquer hydrophilic to water soluble.

4. The composition of claim 1, further comprising a water dispersible to water soluble acid catalyst to accelerate the hardening.

5. The composition of claim 1, wherein said plasticizing synthetic resins of (b) were formed by copolymerization with alkyd resins which have acid numbers of 35 to 300.

6. The composition of claim 1, wherein said plasticizing synthetic resins of (b) were formed by copolymerization with alkyd resins which have acid numbers of 40 to 50.

7. The composition of Claim 1 wherein said plasticizing synthetic resins of (b) were formed by copolymerization with alkyd resins which have acid numbers of 70 to 120.

8. The composition of claim 1, wherein said prasticizing synthetic resins of (b) were formed by copolymerization with alkyd resins which are partial esters of polyols selected from the group consisting of glycerol, pentaerythrite and trimethylol propane with the adduct formations of alpha-beta unsaturated dicarboxylic acids selected from the group consisting of maleic, furamic, itaconic, mesaconic and aconitic acid on high molecular weight citraconic, mesaconic and aconitic acid on high molecular weight unsaturated fatty acids.

9. The composition of claim 1, wherein said plasticizing synthetic resins of (b) are composed of polymers of polymerizable vinyl monomers and the ratio of said vinyl monomers to said alkyd resins is 1:9 to 9:1.

10. The composition of claim 1, wherein said plasticizing synthetic resins of (b) are composed of polymers of polymerizable vinyl monomers and the ratio of said vinyl monomers to said alkyd resins is 2:8 to 4:6.

11. The composition of claim 1, wherein said plasticizing synthetic resins of (b) are composed of polymers of polymerizable vinyl monomers and alpha-beta ethylenically unsaturated carboxylic acids and that in 1800 grams of total monomer mixture are 3 to 6 acid equivalents.

12. The composition of claim 1 wherein said strong organic nitrogenous bases of (c) are selected from the group consisting of volatile tertiary amines and tertiary amines carrying hydroxyl groups.

References Cited

UNITED STATES PATENTS

| 3,198,759 | 8/1965 | Schmidle | 260—20 |
| 3,230,162 | 1/1966 | Gilchrist | 260—18 |

FOREIGN PATENTS

| 150,863 | 4/1953 | Australia. |

DONALD E. CZAJA, Primary Examiner
W. E. PARKER, Assistant Examiner

U.S. Cl. X.R.

260—21, 842, 850